US008306571B2

(12) United States Patent
Larsson

(10) Patent No.: US 8,306,571 B2
(45) Date of Patent: Nov. 6, 2012

(54) METHOD FOR DEACTIVATING AND POSSIBLY REACTIVATING SIM CARDS

(75) Inventor: Thomas Larsson, Älvsjö (SE)

(73) Assignee: Smarttrust AB, Stockholm (SE)

( * ) Notice: Subject to any disclaimer, the term of this patent is extended or adjusted under 35 U.S.C. 154(b) by 557 days.

(21) Appl. No.: 12/434,159

(22) Filed: May 1, 2009

(65) Prior Publication Data

US 2010/0210306 A1    Aug. 19, 2010

(30) Foreign Application Priority Data

Feb. 13, 2009    (SE) ...................................... 0950078

(51) Int. Cl.
    *H04B 1/00*    (2006.01)
(52) U.S. Cl. ..................... 455/558; 455/435.1; 455/433; 455/432; 455/551; 455/419; 455/405; 455/411; 713/168
(58) Field of Classification Search .................... 455/558
    See application file for complete search history.

(56) References Cited

U.S. PATENT DOCUMENTS

| 6,366,777 | B1 * | 4/2002 | Uusitalo | 455/433 |
|---|---|---|---|---|
| 6,496,690 | B1 * | 12/2002 | Cobo et al. | 455/408 |
| 7,266,371 | B1 * | 9/2007 | Amin et al. | 455/419 |
| 7,437,144 | B1 * | 10/2008 | Andresen et al. | 455/405 |
| 7,539,514 | B2 * | 5/2009 | Shieh et al. | 455/558 |
| 2004/0176092 | A1 * | 9/2004 | Heutschi | 455/435.1 |
| 2005/0075137 | A1 | 4/2005 | Reemtsma | |
| 2006/0058028 | A1 * | 3/2006 | Allison et al. | 455/435.1 |
| 2006/0183500 | A1 * | 8/2006 | Choi | 455/558 |
| 2006/0217106 | A1 * | 9/2006 | Davidson et al. | 455/405 |
| 2007/0167161 | A1 * | 7/2007 | Cheng et al. | 455/435.1 |
| 2008/0153547 | A1 * | 6/2008 | Weigele | 455/558 |
| 2010/0041438 | A1 * | 2/2010 | Brown | 455/558 |
| 2010/0136971 | A1 * | 6/2010 | Holter et al. | 455/435.1 |

FOREIGN PATENT DOCUMENTS

| EP | 0805609 | A2 | 11/1997 |
|---|---|---|---|
| WO | 0213564 | A1 | 2/2002 |
| WO | 03077585 | A1 | 9/2003 |
| WO | 2004105421 | A2 | 12/2004 |

OTHER PUBLICATIONS

International Preliminary Report on Patentability, dated Jun. 2, 2010, in PCT/SE2010/050105.
Supplementary European Search Report, dated Nov. 3, 2011, in EP 10741476.

* cited by examiner

*Primary Examiner* — Kent Chang
*Assistant Examiner* — Benjamin Morales Fernandez
(74) *Attorney, Agent, or Firm* — Young & Thompson

(57) ABSTRACT

When deactivating a subscription and SIM card, the SIM card is connected to the ODA database, an instruction to deactivate the SIM card and cancel the subscription is transferred to the ODA, information in the memory of the SIM card including the IMSI (International Mobile Subscriber Identity) of the SIM card, is transferred to the ODA, which is arranged to be connected to the network, including a HLR/AUC. The ODA retrieves the subscription information, and replaces the IMSI of the SIM card with a temporary IMSI called IMSI-T. The ODA stores the information in the memory of the SIM card together with the IMSI-T in the database. The ODA also stores the information together with the IMSI-T and transfers to the network an instruction to cancel the subscription in the network. The SIM card may be reactivated using the information stored in the ODA database and on the SIM card including the IMSI-T.

12 Claims, 2 Drawing Sheets

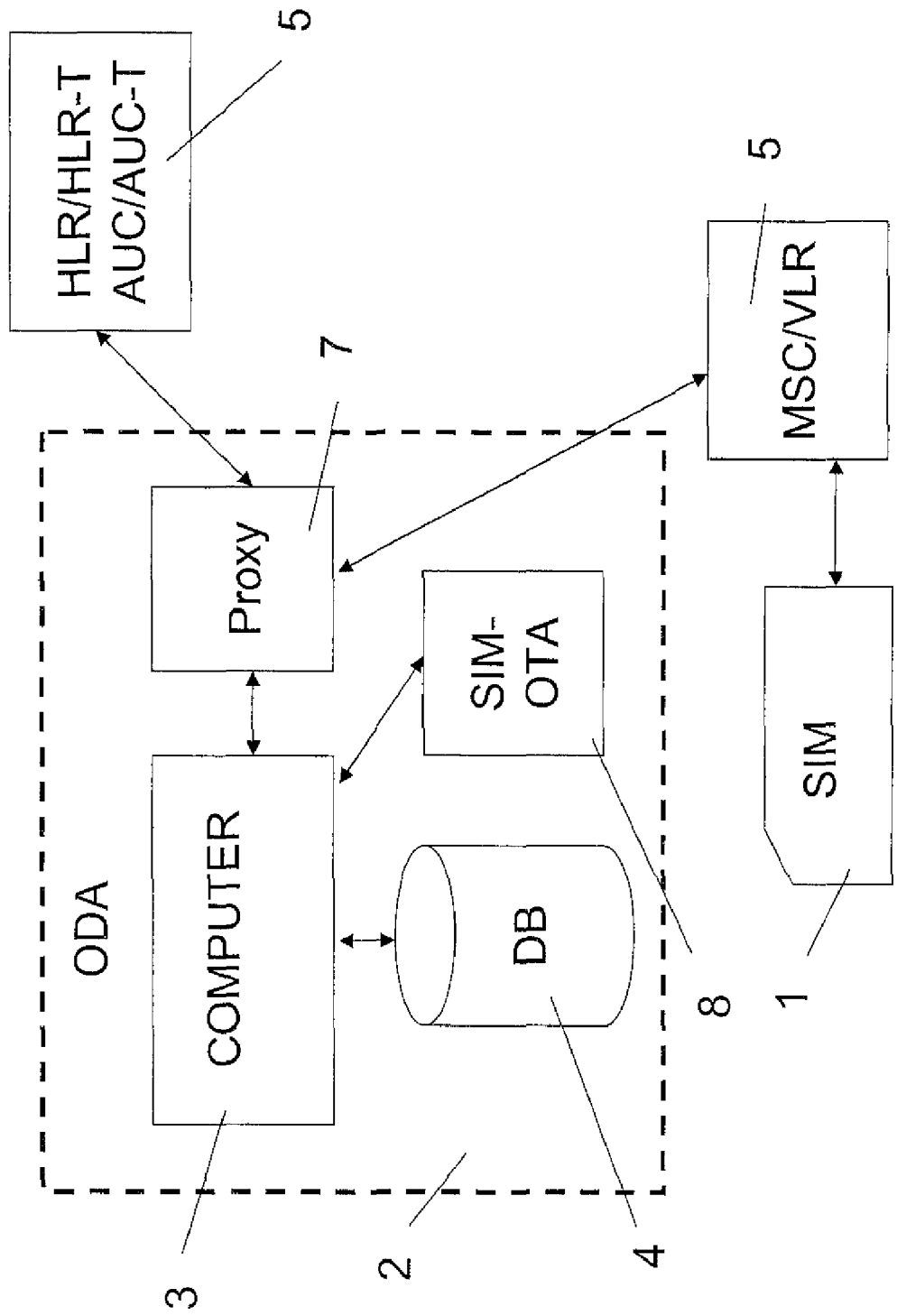

Fig 2

| IMSI_T | ICCID | Ki | MSISDN_P | IMSI_P | STRATEGY_PROFILE | STATUS |
|---|---|---|---|---|---|---|
| 2400899900000001 | 5432100000001 | Ki_1 | PROFILE | PROFILE | STRAT_PrePaid_20EUR_GOLD | Defined |
| 2400899900000002 | 5432100000002 | Ki_2 | | | | Imported |
| 2400899900000003 | 5432100000003 | Ki_3 | PROFILE | PROFILE | STRAT_PrePaid_00EUR | Defined |
| 2400899900000004 | 5432100000004 | Ki_4 | 46733123432 | 2400802077770002 | STRAT_PrePaid_00EUR | Provisioned |
| 2400899900000007 | 5432100000007 | Ki_7 | 46733123462 | 2400802077770007 | STRAT_PrePaid_MobileBroadband | Provisioned |
| 2400899900000008 | 5432100000008 | Ki_8 | 46733123463 | 2400802077770008 | STRAT_PrePaid_MobileBroadband | Defined |

| STRATEGY_PROFILE | PROFILE | SERVICE_ORDER | SIM_FILE_DATA | PROFILE_DATA | STRAT_MSISDN_P | STRAT_IMSI_P |
|---|---|---|---|---|---|---|
| STRAT_PrePaid_20EUR_GOLD | USIM_PrePaid_20EUR_GOLD | XML_PP20EUR | 0x12EF5643.... | 20 EUR | MSISDN_P_POOL(GOLD) | IMSI_P_POOL(*) |
| STRAT_PrePaid_00EUR | USIM_PrePaid_00EUR | XML_PP00EUR | 0x8865346891.... | 0 EUR | MSISDN_P_POOL(CITY) | IMSI_P_POOL(VLR) |
| STRAT_PrePaid_MobileBroadband | USIM_PrePaid_MobileBroadband | XML_MBB00EUR | 0x1200BC643.... | 50 GBYTE | FORCED | FORCED |

| MSIS_P | GROUP ID |
|---|---|
| 46733123468 | CITY |
| 46733111111 | GOLD |
| 46733888888 | GOLD |
| 46733123470 | CITY |
| 46733123471 | CITY |

| IMSI_P | GROUP ID |
|---|---|
| 2400802077770017 | NORTH |
| 2400802077770018 | NORTH |
| 2400802077770019 | SOUTH |
| 2400802077770020 | NORTH |

METHOD FOR DEACTIVATING AND POSSIBLY REACTIVATING SIM CARDS

TITLE OF THE INVENTION

1. Background of the Invention

The present invention refers to a method for deactivating and possibly reactivating SIM cards for use in mobile telephones.

2. Description of the Related Art

Every installed, inactive, subscription involving a SIM (Subscriber Identity Module) card generates license costs and other costs for resources consumed for the operators of mobile networks. This is also true for SIM cards not activated for some time or even cards that are not activated at all. This is especially true for cards that are used for prepaid mobile telephone services. Such cards, prepaid cards, are stored in large amounts at non-controllable point-of-sales locations, waiting to get sold. When manufactured such cards are provided with information in order to make it possible to use the card immediately after that the card has been sold. Therefore, also the mobile telephone operator stores information related to each card in the operators HLR/AUC (Home Location Register/Authentication Center), such as the cards IMSI (International Mobile Subscriber Identity).

The cost for an operator is dependent on the number of cards registered in the mobile system.

SUMMARY OF THE INVENTION

The present invention solves the problem of having many inactive subscriptions in the system by deactivating the SIM cards when not sold or not used.

The present invention refers to a method of deactivating and possibly reactivating a SIM card (1) and a subscription using an ODA (2) (On Demand Activation) application, comprising a computer (3) and an associated ODA database (4), for deactivating and reactivating the subscription and SIM card in a mobile network, characterised in that, when deactivating a subscription and SIM card (1) the SIM card is connected to the ODA database (4), in that an instruction to deactivate the SIM card and to cancel the subscription is transferred to the ODA (2), in that information in the memory of the SIM card, such as the card definition files comprising the IMSI (International Mobile Subscriber Identity) of the SIM card, are transferred to the ODA (2), in that the ODA (2) is arranged to be connected to the network, including a HLR/AUC (5), in that the ODA retrieves the subscription information, in that the ODA (2) replaces the IMSI of the SIM card with a temporary IMSI called IMSI-T, in that the ODA stores said information in the memory of the SIM card together with the IMSI-T in said database (4), in that the ODA (2) also stores said information together with the IMSI-T and in that the ODA transfers to the network, including the HLR/AUC (5), an instruction to cancel the subscription in the network including HLR/AUC (5) and in that the SIM card (1) may be reactivated using and the information stored in the ODA database (4) and on the SIM card including said IMSI-T.

BRIEF DESCRIPTION OF THE DRAWINGS FIGURES

The present invention is described in more detail below, partially with reference to drawings showing an exemplary embodiment of the invention, where FIG. 1 shows a block diagram illustrating the present invention FIG. 2 shows a table which is an example of data, relating to SIM cards that has been deactivated, which data is stored in a database.

DESCRIPTION OF THE EMBODIMENTS

Thus, the present invention relates to a method of deactivating and possibly reactivating a SIM card and a subscription using an ODA (On Demand Activation) application, comprising a computer and an associated ODA database, for deactivating the SIM card in a mobile network.

According to the invention the SIM card is connected to the ODA database and an instruction to deactivate the SIM card and to cancel the subscription is transferred to the ODA. Information in the memory of the SIM card, such as the card definition files comprising the IMSI (International Mobile Subscriber Identity) of the SIM card, are transferred to the ODA. Thereafter, the ODA (2) is arranged to be connected to the network, including a HLR/AUC (5). The ODA then retrieves the subscription information and replaces the IMSI of the SIM card with a temporary IMSI called IMSI-T. Further, the ODA stores said information in the memory of the SIM card together with the IMSI-T.

The ODA also stores said information in said database. Finally, the ODA transfers to the network an instruction to cancel the subscription in the network and including the HLR/AUC. The SIM card may be reactivated using the information stored in the ODA database and on the SIM card including said IMSI-T.

The ODA application 2 is connected to a SIM-OTA platform 8 to be able to make OTA provisioning of the SIM card.

As described in more detail below the SIM card may be reactivated using the information stored and in that the SIM card may be reactivated using the information stored in the ODA database and on the SIM card including said IMSI-T.

In FIG. 2 the data stored in the ODA database 4 is exemplified. In the upper table there is stated a number of IMSI-T's. Further, for each IMSI-T a number of parameters such as ICCID Integrated Circuit Card Identity), Ki, MISIDN, IMSI-P, Strategy Profile and status are stored in the database 4.

The SIM cards are standard SIM cards which once have been activated and coupled to a subscription.

According to a preferred embodiment of the present invention said deactivation is carried out after the subscription has not been used for a predetermined period of time. This embodiment makes it possible for operators to make automatic cancellations of subscriptions that are not used in their system, thereby lowering the costs. Automatically cancelled subscriptions may be reactivated, for example after a request from a user.

According to another preferred embodiment of the present invention said deactivation is carried out after an approval from the user. This embodiment makes it possible for a user and/or operator to cancel a subscription due to some reason and later on reactivate the subscription if desirable.

According to another preferred embodiment of the present invention said deactivation and/or reactivation is carried out after a decision by the current operator or by a future operator or by an independent third party. This embodiment makes it possible for an operator or independent third party to cancel a subscription in order to reactivate it with another operator's subscription. One example is that a user wants to change to another operator. Another example is that a user wish to change the type of subscription, for example from a pre-paid to a post-paid subscription. A third example is that used SIM cards is recycled and used again.

The present invention thus solves the problem mentioned in the introduction and makes it possible to cut costs by deactivating activated SIM cards.

According to a preferred embodiment of the invention reactivation of the subscription and SIM is carried out after said deactivation is carried out.

According to a preferred embodiment of the invention a deactivated SIM card is reactivated using the information related to the SIM card to be activated in the ODA database 4, where, when a SIM card 1 is inserted into a mobile telephone and the telephone is switched on, the SIM card is connected to the ODA 2 for updating the SIM card with the information related to the SIM card, in that the ODA 2 is arranged to be connected to a HLR/AUC 5 in order to transfer information stored on said updated SIM card, and in that the HLR/AUC is arranged to set up a subscription for the SIM card.

An embodiment for reactivating a SIM card is described below in more detail.

According to this embodiment of the invention the ODA 2 is connected to a SS7 filter 7 located between a HLR/AUC 5 and a MSC 6 (Mobile Services Switching Centre). The memory of the SIM cards 1 contains a IMSI-T, given when deactivated.

Said ODA 2 comprises in its memory for each SIM card a IMSI-T and a card definition file. The IMSI-T received by the ODA from a SIM card matches with the IMSI-T in the database 4. The ODA 2 comprises a SS7 filter 7 located between a HLR/AUC 5 and the mobile telephone. When a SIM card 1 is inserted in a mobile telephone and the telephone is switched on, the said IMSI-T is sent to said SS7 filter 7, which is adapted by means of said IMSI-T to direct information in the memory of the SIM card 1 to the database 4 of the ODA 2. A SAI (Send Authentication Information) signal is then halted in the SS7 filter 7.

Thereafter the IMSI-T is sent from the ODA 2 to a HLR-T/AUC-T (Temporary Home Location Register) of the mobile network. The HLR-T/AUC-T can be a separate HLR/AUC or it can be a part of a HLR/AUC in the network as illustrated in FIG. 1. Thereafter a temporary subscription based on the IMSI-T is created in the HLR-T/AUC-T, and the HLR-T/AUC-T sends information to ODA that IMSI-T is ready for use. After that the IMSI-T is ready for use, the SS7 filter 7 switches the halted SAI signal to the HLR-T/AUC-T. Thereafter, a permanent IMSI (IMSI) together with additional information, such as MSISDN, subscription type, and a authentication key (Ki), billing information etc. is transferred from ODA 2 to said network, including a permanent HLR/AUC (HLR-P/AUC-P) and to the SIM card. Hereby the mobile telephone is thus reactivated and ready for full use. Lastly the IMSI-T is deleted in the HLR-T/AUC-T.

The present invention shall not be considered to be limited to the afore described embodiments, since variations can be made within the scope of the accompanying claims.

The invention claimed is:

1. A method of deactivating i) a SIM card (i) and ii) a subscription of the SIM card using an on-demand-activation application (2, comprising of steps of:
    using a computer (3) and an associated on-demand- activation (ODA) database (4), deactivating the subscription of the SIM card and the SIM card (i) by;
    i) connecting the SIM card to the on-demand-activation (ODA) database (4);
    ii) transferring an instruction to deactivate the SIM card and to cancel the subscription of the SIM card to the on-demand-activation application (2);
    iii) transferring information in a memory of the SIM card, including card definition files comprising the International Mobile Subscriber Identity (IMSI) of the SIM card, to the on-demand-activation application (2);
    iv) arranging the on-demand-activation application (2) to be connected to the network, the network including a Home Location Register/Authentication Center (HLR/AUC);
    v) with the on-demand-activation application, retrieving the subscription information from the Home Location Register/Authentication Center;
    vi) with the on-demand-activation application, replacing the International Mobile Subscriber Identity (IMSI) of the SIM card with a temporary International Mobile Subscriber Identity (IMSI-T); vii) with the on-demand-activation application, a) storing said temporary International Mobile Subscriber Identity (IMSI-T) in the memory of the SIM card, and b) storing said temporary International Mobile Subscriber Identity (IMSI-T) in said on-demand-activation database (4); and viii) with the on-demand-activation application, transferring to the network, including the Home Location Register/Authentication Center (HLR/AUC) (5), an instruction to cancel the subscription of the SIM card in the network including in Home Location Register/Authentication Center (HLR/AUC); wherein the method provides that the SIM card (i) is reactivated using i) the retrieved subscription information and the temporary International Mobile Subscriber Identity (IMSI- T) stored in the on-demand-activation database (4), together with ii) the temporary International Mobile Subscriber Identity (IMSI- T) stored on the SIM card.

2. Method according to claim 1, characterized in, that said deactivation is carried out after the subscription of the SIM card has not been used for a predetermined period of time.

3. Method according to claim 1, characterized in, that said deactivation is carried out after an approval from the user.

4. Method according to claim 1, characterized in, that reactivation of the subscription of the SIM card and SIM card is carried out after said deactivation is carried out.

5. Method according to claim 1, characterized in, that a reactivation of a SIM card is carried out where the new subscription is a subscription which is different from the former, deactivated, subscription of the SIM card on the said SIM card.

6. Method according to claim 1, wherein a deactivated SIM card (i) is activated using the temporary International Mobile Subscriber Identity (IMSI-T) stored in the SIM card:
    i) the deactivated SIM card is inserted into a mobile equipment;
    ii) the mobile equipment is switched on, iii) the on-demand-activation application is connected to the SIM card and updates the on-demand-application database with the temporary International Mobile Subscriber Identity (IMSI-T) stored in the SIM card;
    iv) the on-demand-activation application is connected to a temporary Home Location Register/Authentication Center (HLR/AUC) (5) and transfers the temporary International Mobile Subscriber Identity (IMSI-T) stored in on-demand-application database to the temporary Home Location Register/Authentication Center; and
    v) the temporary Home Location Register/Authentication Center (HLR/AUC) sets up a subscription for the SIM card using the received temporary International Mobile Subscriber Identity (IMSI-T) in order to update the SIM card with subscription information.

7. Method according to claim 2, characterized in, that said deactivation is carried out after an approval from the user.

8. Method according to claim 2, characterized in, that reactivation of the subscription of the SIM card and SIM card is carried out after said deactivation is carried out.

9. Method according to claim 3, characterized in, that reactivation of the subscription of the SIM card and SIM card is carried out after said deactivation is carried out.

10. Method according to claim 2, characterized in, that a reactivation of a SIM card is carried out where the new subscription is a subscription which is different from the former, deactivated, subscription of the SIM card on the said SIM card.

11. Method according to claim 3, characterized in, that a reactivation of a SIM card is carried out where the new subscription is a subscription which is different from the former, deactivated, subscription of the SIM card on the said SIM card.

12. Method according to claim 1, wherein reactivation of a deactivated SIM card (i comprises the steps of:
  i) with the deactivated SIM card inserted in a mobile equipment, connecting the on-demand-activation application to the SIM card and updating the on-demand-application database with the temporary International Mobile Subscriber Identity (IMSI-T) stored in the SIM card;
  ii) connecting the on-demand-activation application to a temporary Home Location Register/Authentication Center (HLR/AUC) (5) and transferring the temporary International Mobile Subscriber Identity (IMSI-T) stored in on-demand-application database to the temporary Home Location Register/Authentication Center; and
  iii) the temporary Home Location Register/Authentication Center (HLR/AUC) setting up a subscription for the SIM card using the received temporary International Mobile Subscriber Identity (IMSI-T), including
  based on the transferred temporary International Mobile Subscriber Identity (IMSI-T), creating a temporary subscription within the temporary Home Location Register/Authentication Center,
  the temporary Home Location Register/Authentication Center sending information to the on-demand-activation application that temporary International Mobile Subscriber Identity IMSI-T) is ready for use,
  the on-demand-activation application finalizing reactivation of the SIM card by transferring a permanent International Mobile Subscriber Identity (IMSI) together with an authentication key to a permanent Home Location Register/Authentication Center and also to the SIM-card.

* * * * *